(12) United States Patent
Moon et al.

(10) Patent No.: US 6,760,179 B2
(45) Date of Patent: Jul. 6, 2004

(54) ADAPTIVE PULSE SHAPING METHOD AND APPARATUS FOR UNLATCHING A VCM IN A DISC DRIVE

(75) Inventors: Myung S. Moon, Longmont, CO (US); Sang H. Lee, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 380 days.

(21) Appl. No.: 09/851,222

(22) Filed: May 8, 2001

(65) Prior Publication Data

US 2002/0018313 A1 Feb. 14, 2002

Related U.S. Application Data

(60) Provisional application No. 60/224,179, filed on Aug. 9, 2000.

(51) Int. Cl.⁷ .............................................. G11B 21/02
(52) U.S. Cl. ....................................................... 360/75
(58) Field of Search .......................................... 360/75

(56) References Cited

U.S. PATENT DOCUMENTS

| | | |
|---|---|---|
| 4,864,437 A | 9/1989 | Couse et al. ................... 360/75 |
| 5,034,837 A | 7/1991 | Schmitz ....................... 360/105 |
| 5,231,556 A | 7/1993 | Blanks ........................ 360/105 |
| 5,241,438 A | 8/1993 | Matsushima ................ 360/105 |
| 5,289,325 A | 2/1994 | Morehouse et al. ......... 360/105 |
| 5,341,260 A | 8/1994 | Jabbari ....................... 360/105 |
| 5,361,182 A | 11/1994 | Sampietro et al. .......... 360/105 |
| 5,363,261 A | 11/1994 | Eckberg et al. ............. 360/105 |
| 5,455,723 A | 10/1995 | Boutaghou et al. ........... 360/75 |
| 5,495,376 A | 2/1996 | Wasson et al. .............. 360/105 |
| 5,600,219 A * | 2/1997 | Gomez ........................ 318/456 |
| 5,615,064 A | 3/1997 | Blank et al. .................. 360/75 |
| 5,633,767 A | 5/1997 | Boutaghou et al. ........... 360/53 |
| 5,729,399 A | 3/1998 | Albrecht et al. .............. 360/75 |
| 5,734,527 A | 3/1998 | Reinhart ..................... 360/105 |
| 5,805,384 A | 9/1998 | Bronshvatch et al. ....... 360/105 |
| 5,831,786 A | 11/1998 | Boutaghou et al. ........... 360/75 |
| 5,936,788 A | 8/1999 | Boutaghou et al. ........... 360/75 |
| 5,959,806 A | 9/1999 | Leung ........................ 360/104 |
| 5,970,997 A | 10/1999 | Hudson et al. ................ 137/1 |
| 5,973,870 A | 10/1999 | Boutaghou et al. ........... 360/53 |
| 6,002,552 A | 12/1999 | Leung ........................ 360/104 |
| 6,212,027 B1 * | 4/2001 | Lee et al. ................. 360/78.14 |
| 2001/0019463 A1 * | 9/2001 | Drouin ........................ 360/75 |

* cited by examiner

*Primary Examiner*—David Hudspeth
*Assistant Examiner*—Mitchell Slavitt
(74) *Attorney, Agent, or Firm*—Westman, Champlin & Kelly (57) ABSTRACT

A method and apparatus for unlatching a VCM in a disc drive is provided in which a determination is made if the VCM is stationary. A first unlatch current pulse that has a first amplitude and first width is applied to the VCM if the VCM is found to be stationary. An incremented unlatch current pulse is then applied to the VCM if the VCM is found to be stationary after application of the first unlatch current pulse. The incremented unlatch current pulse has at least one of an amplitude and a width that is greater than at least one of the corresponding first amplitude and the first width of the first unlatch current pulse.

19 Claims, 7 Drawing Sheets

ADAPTIVE PULSE SHAPING METHOD AND APPARATUS FOR UNLATCHING A VCM IN A DISC DRIVE

CROSS-REFERENCE TO RELATED APPLICATION

This application claims benefit of U.S. Provisional Application No. 60/224,179, filed Aug. 9, 2000, and entitled "ADAPTIVE PULSE SHAPING METHOD FOR UNLATCH IN HARD DISC DRIVE".

FIELD OF THE INVENTION

The present invention relates to voice coil motors (VCM) in disc storage systems. In particular, the present invention relates to an adaptive pulse-shaping method for unlatching a VCM in a disc storage system.

BACKGROUND OF THE INVENTION

In disc drives, a VCM is used to position the transducer heads over a desired radial position on a stack of discs that store information. When the disc drive is energized and the discs are spinning, the VCM positions the heads over data stored on the spinning discs. When the disc drive is de-energized, the discs stop spinning, and the heads with the VCM are moved to a "park" position of the discs. Typically, no data is stored on the park position. Various kinds of latches are used to latch the VCM in the park position when the disc drive is de-energized. A latching mechanism can be a magnetic latch or any other form of mechanical latch.

Unlatching the VCM is one of the first tasks for the disc drive under a cold start condition. In this condition, the latch force may be a combination of the designed latch force of the latching mechanism, the force associated with sticking friction ("stiction") between the heads and the disc, a bias force applied by a flexible head suspension, etc. These forces vary from one drive to another. Further, the VCM actuator system parameters such as the VCM torque constant, $K_t$, can be changed among the drives and as the drive operational environment changes. The latch force can even vary between each unlatch operation because of variations in stiction. In spite of these variations, unlatch operations must always be smooth to prevent damage to the disc and to help ensure proper read/write operations.

One technique for unlatching a VCM is to apply an open loop kick-off current pulse. However, since the latch force can vary widely, applying the same open loop kick-off current pulse for each unlatch operation will not result in a smooth transfer from open loop control to the feedback control. Also, excessive head velocity overshoot may occur, resulting in the head colliding with the disc medium if the kick-off current pulse method is used in a ramp load drive.

Another unlatch technique is described in U.S. Pat. No. 5,600,219 entitled "SENSORLESS CLOSED-LOOP ACTUATOR UNLATCH". This unlatch scheme deals with adjusting unlatch current amplitude incrementally, followed by the application a negative current pulse to decelerate the VCM as soon as the unlatch is confirmed. This system does not take into consideration the possibility of varying the width of unlatch current pulses to optimize the unlatch process. Further, final pulse width and amplitude values of a final unlatch current pulse from a previous unlatch operation are not stored for reference in the next unlatch operation. Thus, this unlatch technique does not guarantee a smooth unlatch process.

The present invention addresses these problems, and offers other advantages over the prior art.

SUMMARY OF THE INVENTION

The present embodiments relate to disc storage systems that employ an adaptive pulse-shaping scheme for unlatching a VCM in a disc drive, thereby addressing the above-mentioned problems.

One embodiment relates to a method for unlatching a VCM in a disc drive. The method includes determining if the VCM is stationary and applying a first unlatch current pulse that has a first amplitude and first width to the VCM if the VCM is found to be stationary. An incremented unlatch current pulse is then applied to the VCM if the VCM is found to be stationary after application of the first unlatch current pulse. The incremented unlatch current pulse has at least one of an amplitude and a width that is greater than at least one of the corresponding first amplitude and the first width of the first unlatch current pulse.

Another embodiment relates to a disc storage system that includes a VCM velocity control loop operating a VCM and an adaptive current pulse shaping means coupled to the VCM velocity control loop. The adaptive current pulse shaping means is capable of providing unlatch current pulse for unlatching the VCM.

These and various other features as well as advantages which characterize the present invention will be apparent upon reading of the following detailed description and review of the associated drawings.

BRIEF DESCRIPTION OF THE DRAWINGS

FIG. 4-1 is a flow diagram of an incremental pulse shaping algorithm (IPSA) of the present invention.

FIG. 4-2 is an example of incremental pulse shaping by the IPSA of FIG. 4-1.

FIG. 5-1 is a flow diagram of a decremental pulse shaping algorithm (DPSA) of the present invention.

FIG. 5-2 shows example of decremental pulse shaping by the DPSA of FIG. 5-1.

DETAILED DESCRIPTION OF ILLUSTRATIVE EMBODIMENTS

Figure 1:
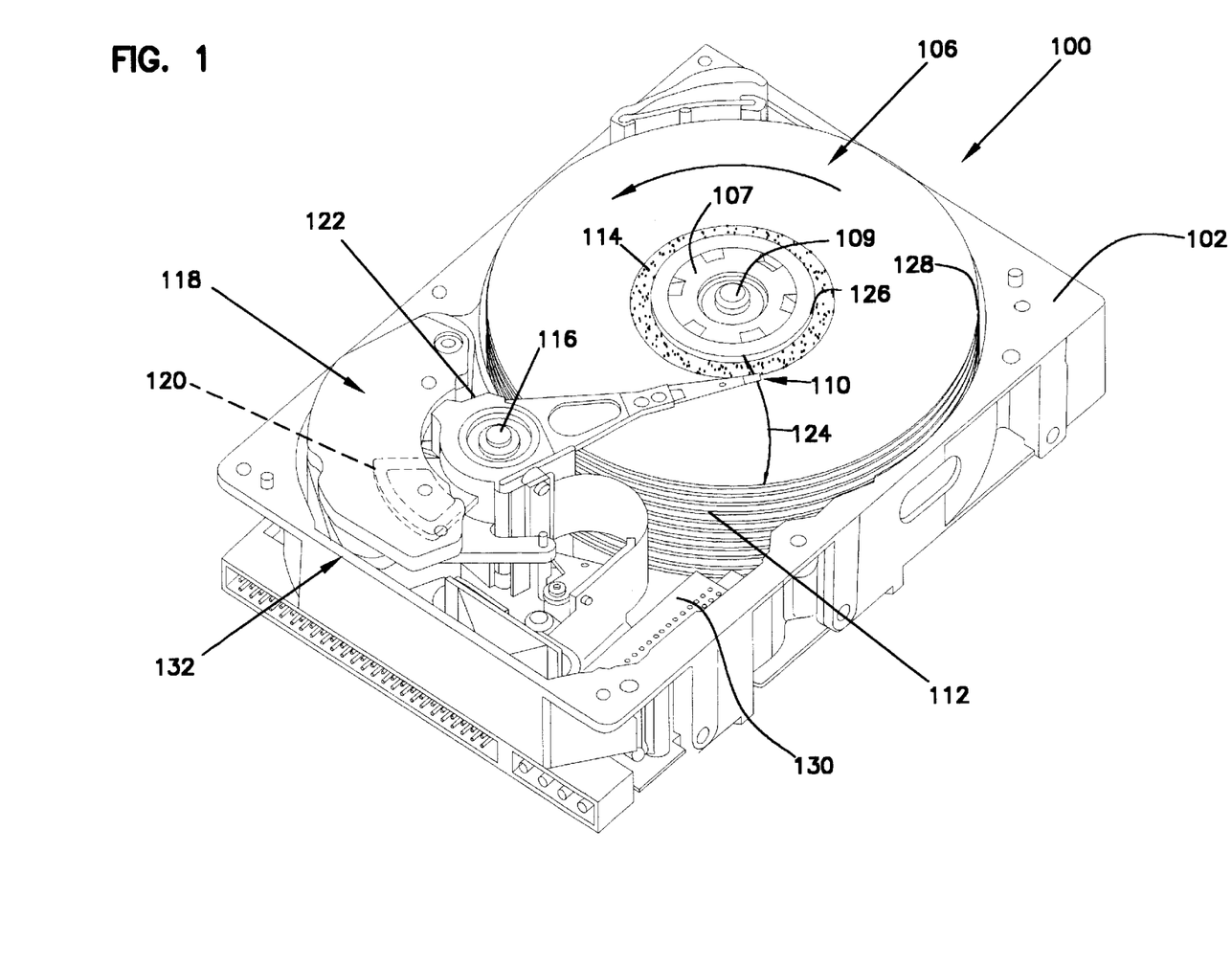
FIG. 1 is a perspective view of an exemplary magnetic disc drive in which the present invention can be used.

Referring now to FIG. 1, a perspective view of a magnetic or optical disc drive 100 with which the present invention is useful is shown. Disc drive 100 includes a housing with a base 102 and a top cover (not shown). Disc drive 100 further includes a disc pack 106, which is mounted on a spindle motor (not shown), by a disc clamp 107. Disc pack 106 includes a plurality of individual discs, which are mounted for co-rotation about central axis 109. Each disc surface has an associated transducer head 110, which is mounted on a head assembly 112 mounted to disc drive 100 for communication with the disc surfaces. Transducer head 110 can include a read head, a write head, or both a read and a write head. Each disc surface further includes a park surface 114, which is textured, for parking transducer head 110 when the disc drive 100 is de-energized. Head assembly 112 is mounted to a bearing 122 which is actuated to rotate or pivot on an axle shaft 116, or other pivot point, which is mounted to the base 102. A VCM, shown generally at 118, actuates a voice coil 120 that is attached to the bearing 122. VCM 118 rotates bearing 122 with its attached head assembly 112 about the axle shaft 116 to position transducer head 110 over a desired data track along an arcuate path 124 between a disc inner diameter 122 and a disc outer diameter 128. VCM 118 operates under control of internal circuitry 130. When disc drive 100 is de-energized, the VCM 118 moves the head to the park surface 114, and a latch, shown generally at 132, latches the VCM in a position that parks the transducer head 110 on the park surface 114. Various kinds of latches are used to latch VCM 118 in the park position when the disc drive is de-energized. A latching mechanism can be a magnetic latch or any other form of mechanical latch.

Under the present invention, an adaptive current pulse-shaping scheme is employed for unlatching VCM 118. This scheme involves the application of a series of amplitude and pulse-width adjusted unlatch current pulses that cope with the variation of latch torque amplitude caused by variations in stiction, changes in latch force distribution, variation of torque constant, $K_t$, etc. A VCM velocity control loop contained in internal circuitry 130 includes the adaptive current pulse-shaping circuit of the present invention.

Figure 2:
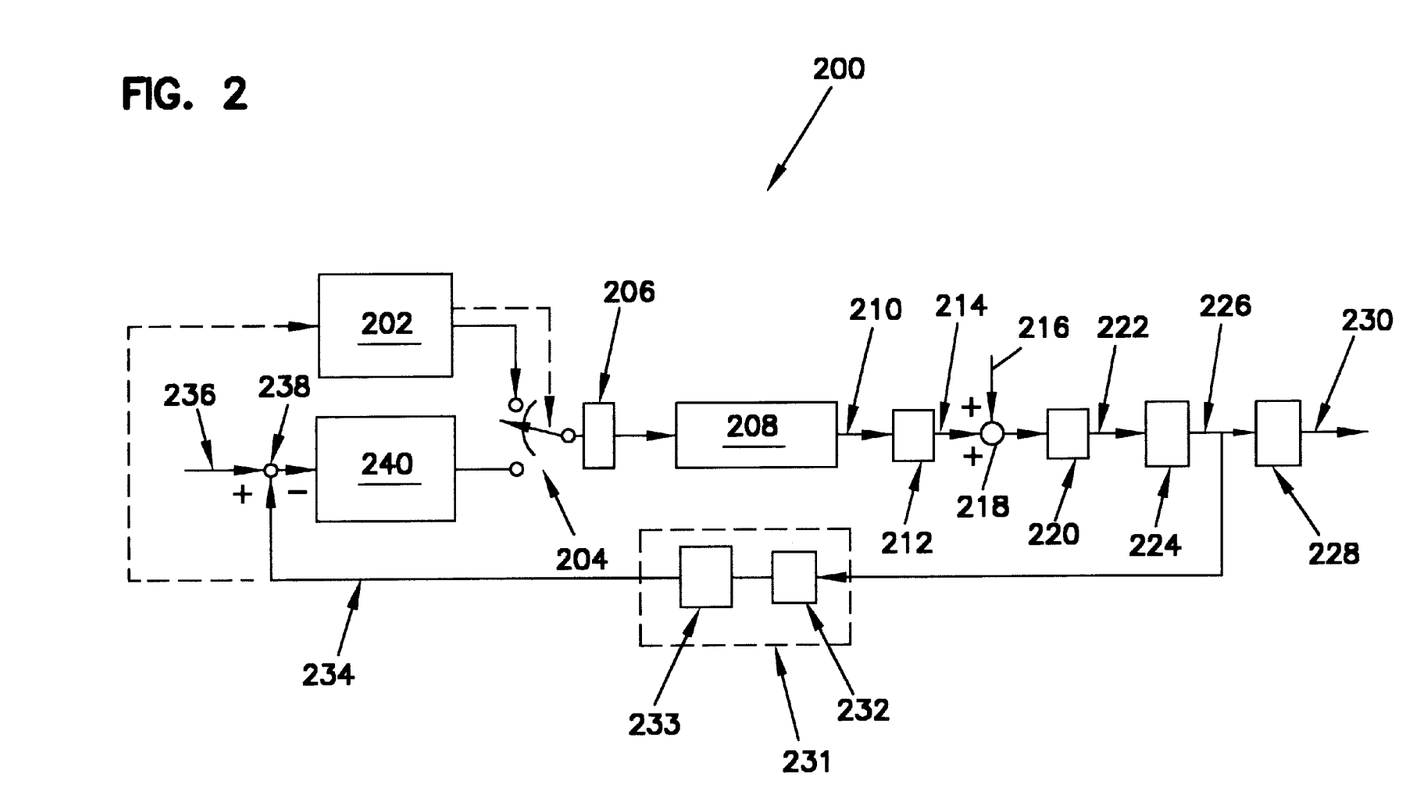
FIG. 2 is a block diagram of a VCM velocity control loop employing the adaptive current pulse shaping circuit of the present invention.

Referring now to FIG. 2, a block diagram of a VCM velocity control loop 200 employing an adaptive current pulse shaping module or circuit 202 of the present invention is shown. Loop 200 includes a transconductance amplifier 208 that provides initial demand current to unlatch VCM 118 from a stationary to an energized state. Transconductance amplifier 208 also supplies demand current to drive the VCM 118 when the disc drive is energized and the discs are spinning.

Digital controlling code (hereinafter amplitude and pule width parameters) from either adaptive current pulse shaping circuit 202 (during unlatch operations) or velocity feedback controller 240 (when the VCM is energized) is converted to analog input voltage signals for transconductance amplifier 208 by digital to analog converter (DAC) 206. Switch 204 connects either adaptive current pulse shaping circuit 202 or velocity feedback controller 240 to DAC 206. Based on the amplitude and pulse width parameters, transconductance amplifier 208 outputs VCM unlatch/drive current ($i_L$) 210 which produces VCM driving torque ($\tau$) 214. Block 212 represents VCM torque constant $K_t$. Torque disturbance ($\tau_d$) 216, which exists inherently in the system, is combined with $\tau$ at summing node 218. Block 220 represents VCM arm inertia ($1/J_m$). VCM angular acceleration (a) 222 is integrated at block 224 to produce VCM angular velocity ($\omega$) 226 having units of radians/second. Angular velocity, $\omega$, is integrated at block 228 to provide VCM position ($\theta$) 230 in radians. In block 231, angular velocity, $\omega$, is multiplied by back emf coefficient, $K_e$, shown by block 232 and fed to analog to digital converter (ADC) 233 that outputs back emf voltage ($V_{bemf}$) 234 in a digital form which is monitored to examine movement of VCM 118. $V_{bemf}$ is fed to adaptive current pulse shaping circuit 202 and also deducted from reference voltage (Vref) 236 at summing node 238. The output of summing node 238 is fed to velocity feedback controller 240 which provides fast and damped VCM velocity control when movement of the VCM is confirmed after the completion of an unlatch operation.

The method of operation of the adaptive current pulse shaping circuit 202 of the VCM velocity control loop 200 is described below with the help of flow diagrams 300, 400 and 500.

Figure 3:
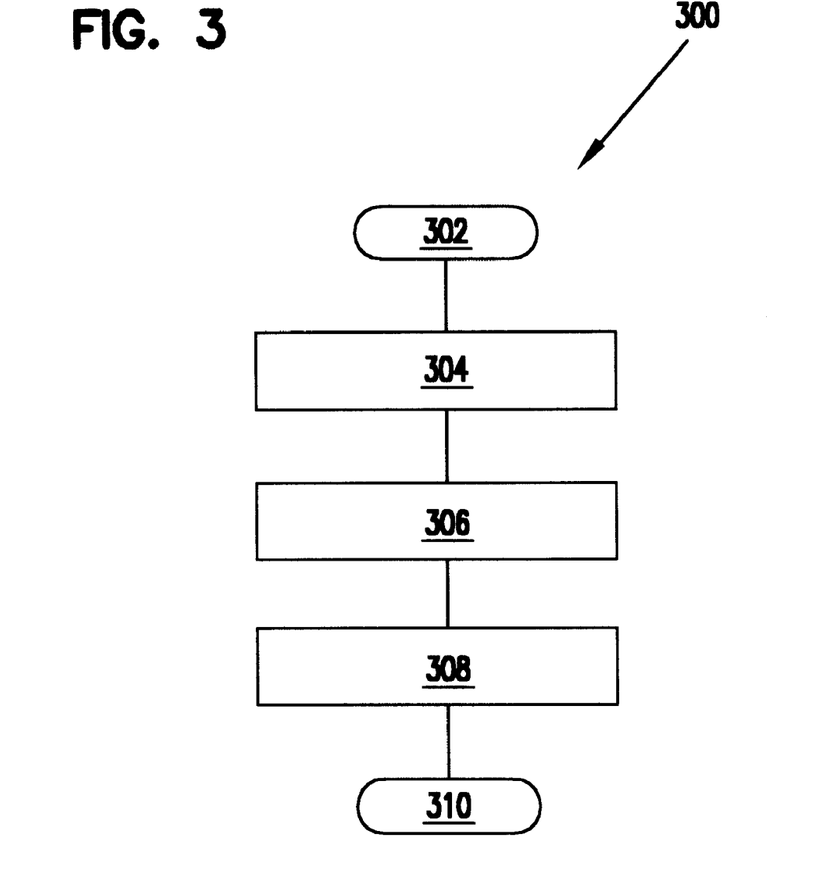
FIG. 3 is a simplified flow diagram of the present invention.

Referring now to FIG. 3, a simplified flow diagram 300 illustrating a method of unlatching a VCM of a disc drive in accordance with the present invention is shown. The method shown in flow diagram 300 begins at state 302 and proceeds to state 304 where a determination is made if the VCM is stationary. In state 306, a first unlatch current pulse that has a first amplitude and first width is applied to the VCM if the VCM is found to be stationary. The method continues at state 308 where an incremented unlatch current pulse is then applied to the VCM if the VCM is found to be stationary after application of the first unlatch current pulse. The incremented unlatch current pulse has at least one of an amplitude and a width that is greater than at least one of the corresponding first amplitude and the first width by an incremental value. A series of incremented current pulses may be applied until the VCM unlatches. The process ends at state 310.

Algorithms to increase and decrease the amplitude and pulse-width parameters while performing the unlatch operation in states 306 and 308 (of FIG. 3) are described below.

Figure 41:
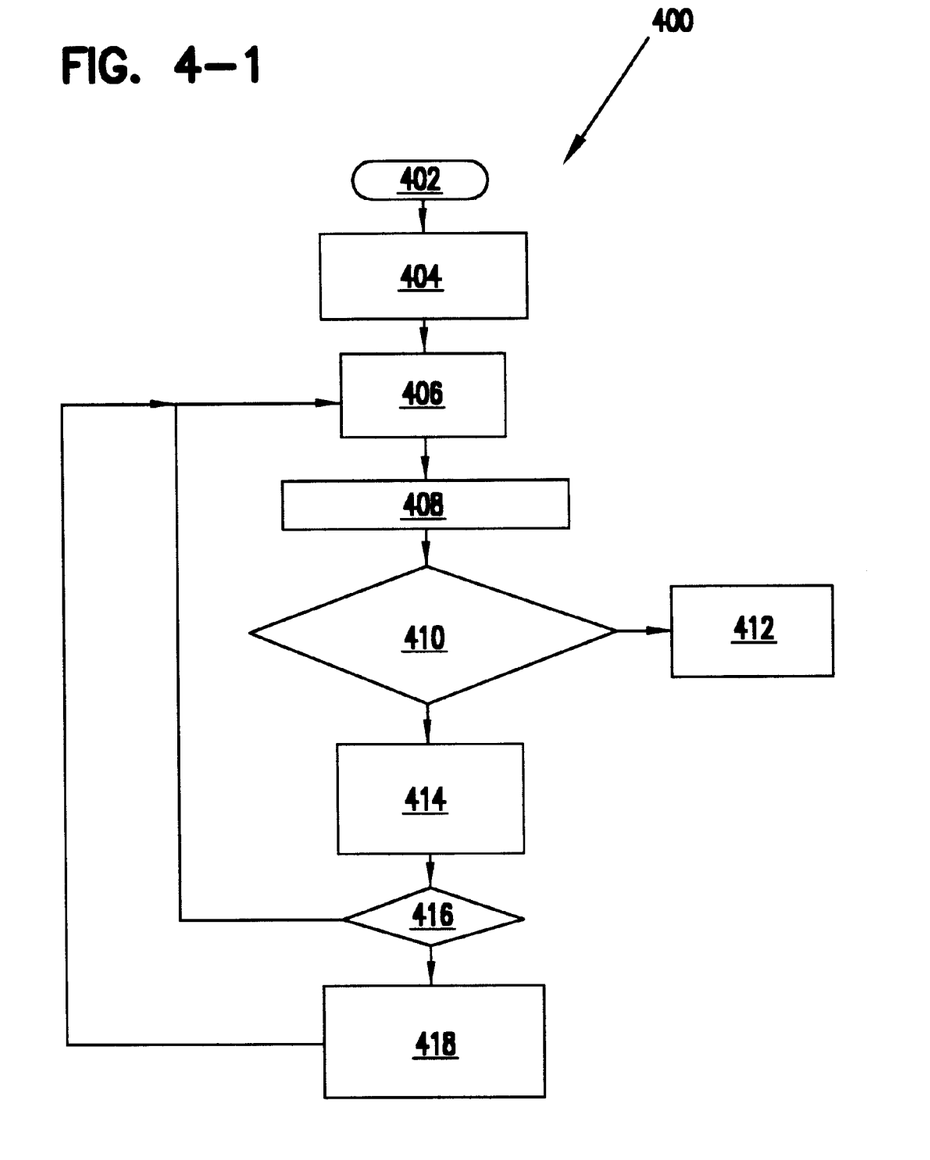

Referring now to FIG. 4-1, a flow diagram of an IPSA of the present invention is shown. The method shown in flow diagram 400 is performed for one or more iterations. Flow diagram 400 begins at state 402 and proceeds to state 404 where a minimum or initial amplitude, $h_{min}$, and a minimum or initial pulse-width, $w_{min}$, are set for an initial unlatch current pulse. At state 406, an unlatch current pulse $I_p$ with amplitude $h_n$ ($h_n=h_{min}$ for the first iteration, $h_1$, $h_2$, etc., for subsequent iterations) and width $w_n$ ($w_n=w_{min}$ for the first iteration, $w_1$, $w_2$, etc., for subsequent iterations) is applied to the VCM. At state 408, the VCM is disabled to read its back emf voltage, $V_{bemf}$, which is used to monitor VCM movement.

In state 410, $V_{bemf}$ is compared with a threshold value of $V_{bemf}$ ($\alpha$) for indication of VCM movement. If $V_{bemf}$ is greater than the threshold value, $\alpha$, then the unlatch operation terminates and the VCM operation switches to feedback control at state 412.

If $V_{bemf}$ is below cc in state 410, then the unlatch current pulse amplitude is increased from the amplitude of the unlatch current pulse of the previous iteration, $h_{n-1}$, by an incremental amplitude value, $\Delta_1$, to provide a current iteration amplitude, $h_n=h_{n-1}+\Delta_1$, in state 414.

In state 416, $h_n$ is compared with a maximum amplitude value, $h_{max}$. If $h_n$ is less than $h_{max}$ in state 416, then states 406, 408, 410, 414 and 416 repeated until either $V_{bemf}$ is greater than $\alpha$ at state 410 or $h_n$ is greater than $h_{max}$ at state 416 in a subsequent iteration.

If $h_n$ is greater than $h_{max}$ at state 416, then at state 418, $h_n$ is set equal to $h_{max}$ and the current pulse width is increased from the unlatch current pulse of the previous iteration, $w_{n-1}$, by an incremental pulse-width value, $\Delta_2$, to provide a current iteration pulse-width $w_n=w_{n-1}+\Delta_2$.

States 406, 408, 410, 414, 416 and 418 are repeated until the VCM is unlatched ($V_{bemf}$ is greater than $\alpha$ at state 410).

Figure 42:
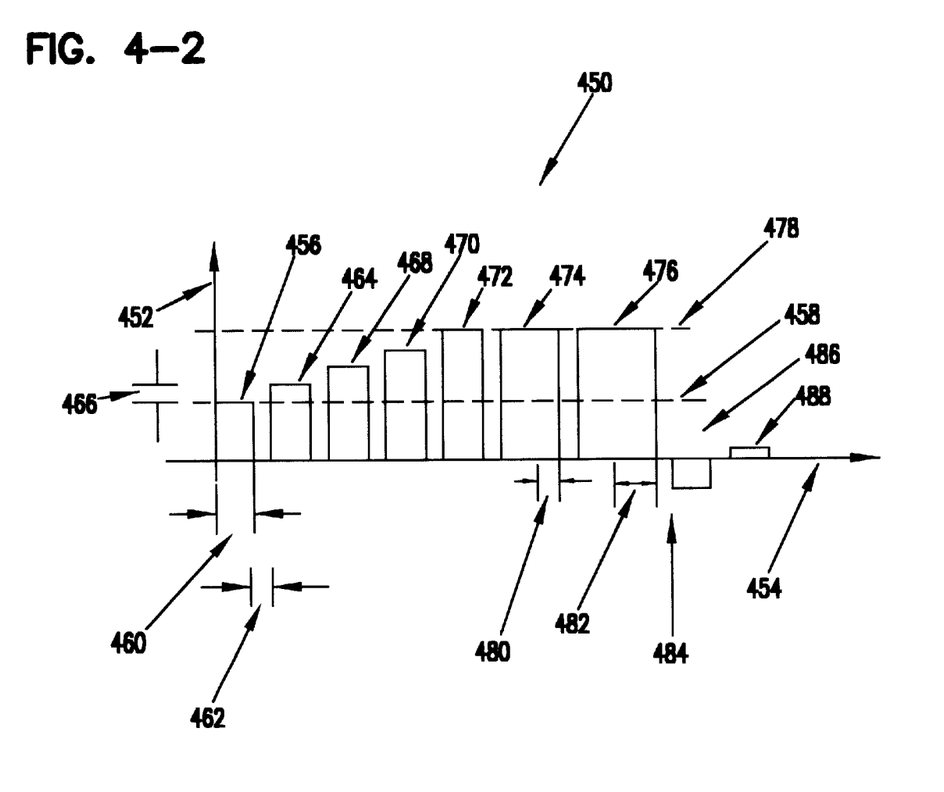

Referring now to FIG. 4-2, an example of incremental pulse shaping by the IPSA of FIG. 4-1 is shown. Plot 450 shows the variation of unlatch current along vertical axis 452 as a function of time along horizontal axis 454. An initial unlatch current pulse 456, applied by the IPSA, has an initial or minimum amplitude 458 ($h_{min}$) and an initial or minimum pulse width 460 ($w_{min}$). Time duration 462 is the period during which the back emf of the VCM ($V_{bemf}$) is monitored. A second unlatch current pulse 464 is applied after $V_{bemf}$ is monitored. The amplitude of second pulse 464 is greater than that of initial pulse 456 by incremental amplitude value 466 ($\Delta_1$). The amplitudes of pulses 468 and 470 are similarly increased while $V_{bemf}$ is monitored between each pulse. Pulse 472 has a maximum amplitude 478 ($h_{max}$), but the application of this maximum amplitude pulse does not result in the VCM being unlatched. Since a pulse with $h_{max}$ has been applied and the VCM is still not unlatched, pulse 474 is increased in width by an incremental pulse width value 480 ($\Delta_2$). The VCM is unlatched when pulse 476 is applied. Pulse 476 has a width increased by 482 ($2\Delta_2$) from $w_{min}$. The unlatch is confirmed at time 484 by the $V_{bemf}$ monitoring process. This results in termination of the unlatch process and the velocity feedback controller taking control of the VCM. Pulses 486 and 488 are variations of VCM current with the velocity feedback controller driving the VCM. The amplitude and width of pulse 476 is saved at the end of the unlatch operation.

Figure 51:
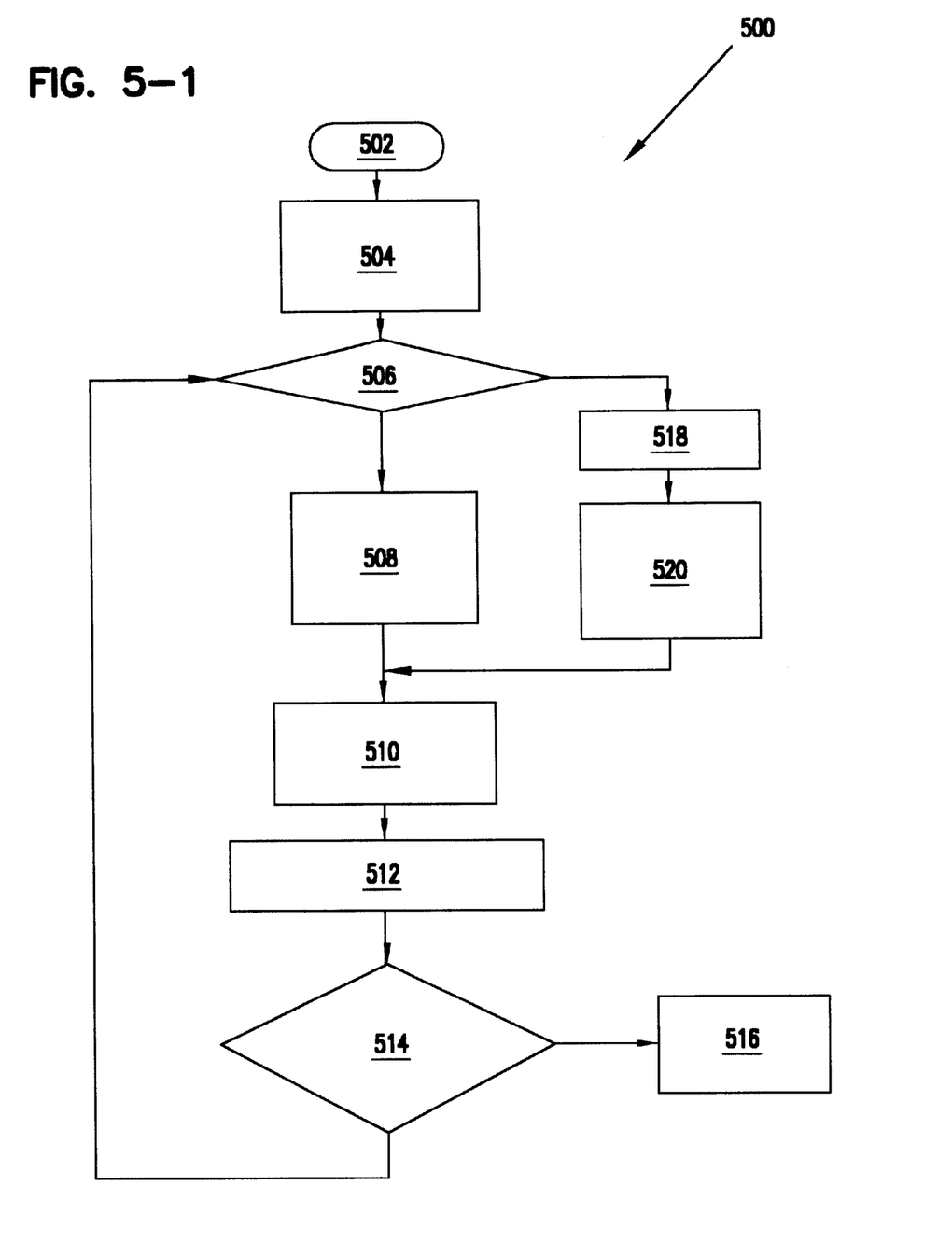

Referring now to FIG. 5-1, a DPSA in accordance with the present invention is shown. The method illustrated if flow diagram 500 is essentially the method of flow diagram 400 (IPSA) performed in reverse order. Amplitude and pulse-width values from a previous unlatch operation which were stored serve as the initial amplitude and pulse with values for the DPSA. The pulse-width is first decreased in steps for each iteration until it reaches a minimum value and then the amplitude is decreased for each additional iteration. During each iteration the VCM is monitored for movement. These steps are therefore in reverse order of IPSA flow diagram 400 which involved increasing amplitude in steps and then increasing pulse-width in steps. Details of flow diagram 500 are described below.

The method illustrated in flow diagram 500 is performed for one or more iterations. Flow diagram 500 begins at state 502 and proceeds to state 504 where an unlatch current pulse amplitude is set to a previous amplitude value, $h_{n-1}$ and a previous pulse-width value, $w_{n-1}$, stored at the end of a previous unlatch operation. In state 506, $w_n$ is compared with minimum pulse-width value $w_{min}$. If $w_n$ is greater than $w_{min}$, then the unlatch current pulse-width is decreased from the pulse-width of the unlatch current pulse of the previous iteration, $w_{n-1}$, by an decremental pulse width value, $\Delta_2$, to provide a current iteration pulse-width, $w_n = w_{n-1} - \Delta_2$, in state 508. In state 510, an unlatch current pulse $I_p$ with amplitude $h_n$ and width $w_n(w_{n-1} - \Delta_2)$ is applied to the VCM.

At state 512, the VCM is disabled to read its back emf voltage, $V_{bemf}$. In state 514, $V_{bemf}$ is compared with a threshold value of $V_{bemf}$ ($\alpha$) for indication of VCM movement. If $V_{bemf}$ is greater than the threshold value, $\alpha$, then the unlatch operation terminates and the VCM operation switches to feedback control at state 516.

If $V_{bemf}$ is below $\alpha$ in state 514, then steps 506, 508, 510, 512 and 514 are repeated until either $V_{bemf}$ is found to be greater than $\alpha$ at state 514 or $w_n$ is less than $w_{min}$ at state 506.

If $w_n$ is less than $w_{min}$ at state 506, then at state 518, $w_n$ is set equal to $w_{min}$ and the unlatch current pulse amplitude is decreased from the unlatch current amplitude of the previous iteration, $h_{n-1}$, by a decremental pulse-width value $\Delta_1 (h_n = h_{n-1} - \Delta_1)$ in state 520.

States 506, 518, 520, 510, 512 and 514 are repeated until the VCM is unlatched ($V_{bemf}$ is greater than $\alpha$ at state 514) or until the amplitude of the unlatch current pulse has reached a minimum value $h_{min}$. If the VCM is still not unlatched at $h_{min}$, then the DPSA is terminated and the unlatch operation continues with the application of the IPSA.

Figure 52:
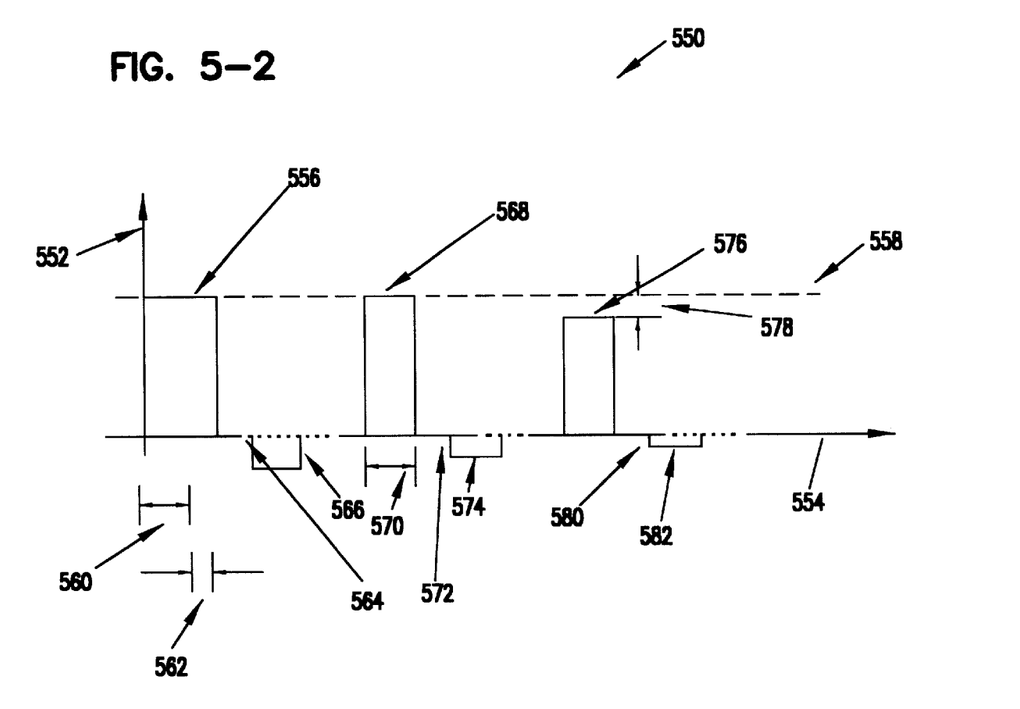

Referring now to FIG. 5-2, examples of decremental pulse shaping by the DPSA of FIG. 5-1 is shown. Plot 550 shows the variation of unlatch current along vertical axis 552 as a function of time along horizontal axis 554. Plot 550 includes three separate unlatch operations performed by the DPSA algorithm. The first unlatch operation performed by the DPSA includes the application of pulse 556 which has, for example, a amplitude equal to maximum amplitude value 558 ($h_{max}$) and a pulse-width equal to minimum pulse width value 560 ($w_{min}$) plus incremental pulse width value 562 ($\Delta_2$). The first unlatch is confirmed at time 564 by the $V_{bemf}$ monitoring process and the amplitude and pulse width values are saved. This results in termination of the unlatch process and the velocity feedback controller taking control of the VCM. Pulses 566 is deceleration pulse applied the velocity feedback controller.

Pulse 568 is applied at the beginning of a second unlatch operation. Pulse 568 has an amplitude 558 of $h_{max}$ and a pulse-width 570 of $w_{min}$ which is less than the pulse width of the first unlatch operation by $\Delta_2$. The unlatch is confirmed by the VCM monitoring process at time 572 and the second unlatch operation is terminated. Pulse 574 is a deceleration pulse similar to pulse 566 but not as strong because the Pulse 568 has a width that is less than pulse 556 and therefore has reduced overshoot.

In the third unlatch operation a pulse with an amplitude less than $h_{max}$ (the amplitude value of pulses 566 and 568) by value 578 ($\Delta_1$) is applied to the VCM. Again, the unlatch is confirmed by the VCM monitoring process at time 580 and the third unlatch operation is terminated. A very small deceleration pulse 582 is applied because of the decreased strength of pulse 576 compared to pulses 556 and 568.

In summary, a method embodiment of unlatching a VCM in a disc drive storage system includes a state (such as 304) for determining if the voice coil motor is stationary. In a second state (such as 306) a first unlatch current pulse that has a first amplitude and first width is applied to the VCM if the VCM is found to be stationary. In a third state (such as 308) an incremented unlatch current pulse is applied to the VCM if the VCM is found to be stationary after application of the first unlatch current pulse. The incremented unlatch current pulse has at least one of an amplitude and a width that is greater than at least one of the corresponding first amplitude and the first width by an incremental value.

In a disc storage system embodiment a VCM velocity control loop (such as 200) includes a transconductance amplifier (such as 208) that drives a VCM (such as 118) and a back emf sensing circuit (such as 233) that monitors movement of the VCM (such as 118). Loop (such as 200) also includes an adaptive current pulse shaping circuit (such as 202) adapted to apply a first unlatch current pulse that has a first amplitude and first width to the VCM (such as 118) if the VCM (such as 118) is found to be stationary by the back emf sensing circuit (such as 233), and to apply incremented unlatch current pulse to the VCM (such as 118) if the VCM (such as 118) is found to be stationary by the back emf sensing circuit (such as 233) after application of the first unlatch current pulse. The incremented unlatch current pulse has at least one of an amplitude and a width that is greater than at least one of the corresponding first amplitude and the first width by an incremental value.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc storage system while maintaining substantially the same functionality without departing from the scope and spirit of the present invention. In addition, although the preferred embodiment described herein is directed to an adaptive pulse shaping scheme for unlatching a VCM for a disc storage system, it will be appreciated by those skilled in the art that the teachings of the present invention can be applied to other systems, without departing from the scope and spirit of the present invention. Further, the adaptive pulse shaping scheme may be implemented in hardware instead of software without departing from the scope and spirit of the present invention. Other modifications can also be made. The disc drive can be based upon magnetic, optical, or other storage technologies and may or may not employ a flying slider.

What is claimed is:

1. A method of unlatching a voice coil motor (VCM), the method comprising:

forming a first unlatch current pulse based upon a final unlatch current pulse from a previous VCM unlatch operation.

2. The method of claim 1 wherein forming the first unlatch current pulse based upon the final unlatch current pulse from the previous VCM unlatch operation comprises utilizing a final amplitude of the final unlatch current pulse as a first amplitude for the first unlatch current pulse.

3. The method of claim 1 wherein forming the first unlatch current pulse based upon the final unlatch current pulse from the previous VCM unlatch operation comprises utilizing a final width of the final unlatch current pulse as a first width for the first unlatch current pulse.

4. The method of claim 1 wherein a final amplitude and a final width of the final unlatch current pulse are stored in a memory.

5. The method of claim 4 further comprising retrieving the final amplitude and the final width of the unlatch current pulse from the memory.

6. The method of claim 1 wherein the first unlatch current pulse is a decremented unlatch current pulse having at least one of an amplitude and a width less than at least one of a corresponding one of a final amplitude and a final width of the final unlatch current pulse by a decremental value.

7. The method of claim 1 further comprising applying the first unlatch current pulse to the VCM.

8. The method of claim 7 further comprising applying an incremented unlatch current pulse to the VCM, the incremented unlatch current pulse having at least one of an amplitude and a width greater than at least one of a corresponding one of a first amplitude and a first width of the first unlatch current pulse by an incremental value, the incremented unlatch current pulse being applied if the VCM is found to be stationary after applying the first unlatch current pulse to the VCM.

9. The method of claims 8 further comprising repeating the step of applying the incremented unlatch current pule iteratively with each iteration applying a current iteration incremented unlatch pulse to the VCM, the current iteration incremented unlatch pulse having at least one of a current iteration amplitude and a current iteration width greater than at least one of a corresponding amplitude and a width of an incremented unlatch current pulse of an immediately previous iteration by the incremental value, the iterations being repeated until the VCM moves.

10. An apparatus comprising:

a VCM; and a circuit configured to form a first unlatch current pulse based upon a final unlatch current pulse from a previous VCM unlatch operation.

11. The apparatus of claim 10 wherein the circuit is further configured to form the first unlatch current pulse based upon the final unlatch current pulse from the previous VCM unlatch operation by utilizing a final amplitude of the final unlatch current pulse as a first amplitude for the first unlatch current pulse.

12. The apparatus of claim 10 wherein the circuit is further configured to form the first unlatch current pulse based upon the final unlatch current pulse from the previous VCM unlatch operation by utilizing a final width of the final unlatch current pulse as a first width for the first unlatch current pulse.

13. The apparatus of claim 10 further comprising a memory configured to store a final amplitude and a final width of the final unlatch current pulse.

14. The apparatus of claim 13 wherein the circuit is further configured to retrieve the final amplitude and the final width of the unlatch current pulse from the memory.

15. The apparatus of claim 10 wherein the first unlatch current pulse is a decremented unlatch current pulse having at least one of an amplitude and a width less than at least one of a corresponding one of a final amplitude and a final width of the final unlatch current pulse by a decremental value.

16. The apparatus of claim 10 wherein the circuit is further configured to apply the first unlatch current pulse to the VCM.

17. The apparatus of claim 16 wherein the circuit is further configured to apply an incremented unlatch current pulse to the VCM, the incremented unlatch current pulse having at least one of an amplitude and a width greater than at least one of a corresponding one of a first amplitude and a first width of the first unlatch current pulse by an incremental value, the incremented unlatch current pulse is applied to the VCM by the circuit if the VCM is found to be stationary after the first unlatch current pulse is applied to the VCM by the circuit.

18. The apparatus of claim 17 wherein the circuit is further configured to repeat the step of applying the incremented unlatch current pulse iteratively with each iteration applying a current iteration incremented unlatch pulse to the VCM, the current iteration incremented unlatch pulse having at least one of a current iteration amplitude and a current iteration width greater than at least one of a corresponding amplitude and a width of an incremented unlatch current pulse of an immediately previous iteration by the incremental value, the iterations being repeated until the VCM moves.

19. An apparatus comprising:

a VCM; and a pulse shaping means for providing unlatch current pulses adaptively for unlatching the VCM.

* * * * *

UNITED STATES PATENT AND TRADEMARK OFFICE
CERTIFICATE OF CORRECTION

PATENT NO. : 6,760,179 B2
DATED : July 6, 2004
INVENTOR(S) : Moon et al.

It is certified that error appears in the above-identified patent and that said Letters Patent is hereby corrected as shown below:

Title page,
Item [56], References Cited, U.S. PATENT DOCUMENTS, please replace
"5,734,527 A  3/1998  Reinhart  360/105" with
-- 5,743,527 A  3/1998  Reinhart  360/105 --.
Please replace "5,936,788 A  8/1999  Boutaghou et al.  360/75" with
-- 5,963,788 A  8/1999  Boutaghou et al.  360/75 --.

Signed and Sealed this

Seventh Day of December, 2004

JON W. DUDAS
*Director of the United States Patent and Trademark Office*